(12) United States Patent
Okubo et al.

(10) Patent No.: US 10,148,865 B2
(45) Date of Patent: Dec. 4, 2018

(54) FOCUS DETECTION APPARATUS AND FOCUS DETECTION METHOD

(71) Applicant: Olympus Corporation, Hachioji-shi, Tokyo (JP)

(72) Inventors: Ryuhi Okubo, Asaka (JP); Kazumi Ito, Fuchu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/613,184

(22) Filed: Jun. 3, 2017

(65) Prior Publication Data

US 2017/0374270 A1 Dec. 28, 2017

(30) Foreign Application Priority Data

Jun. 23, 2016 (JP) ................................. 2016-124564

(51) Int. Cl.
| | |
|---|---|
| H04N 5/232 | (2006.01) |
| G02B 7/34 | (2006.01) |
| G02B 7/36 | (2006.01) |
| G03B 17/14 | (2006.01) |

(52) U.S. Cl.
CPC .......... *H04N 5/23212* (2013.01); *G02B 7/34* (2013.01); *G02B 7/36* (2013.01); *G03B 17/14* (2013.01); *G03B 2206/002* (2013.01)

(58) Field of Classification Search
CPC .... H04N 5/23212; H04N 5/3696; G02B 7/34; G02B 7/36; G03B 17/14; G03B 2206/002
See application file for complete search history.

(56) References Cited

U.S. PATENT DOCUMENTS

| | | | | |
|---|---|---|---|---|
| 9,900,525 | B2* | 2/2018 | Kawai | H04N 5/3696 |
| 9,918,005 | B2* | 3/2018 | Nakamaru | H04N 5/23296 |
| 2004/0207747 | A1* | 10/2004 | Ikeda | H04N 5/2254 |
| | | | | 348/335 |
| 2015/0304546 | A1* | 10/2015 | Izawa | H04N 5/3696 |
| | | | | 348/229.1 |
| 2016/0182811 | A1 | 6/2016 | Ito et al. | |
| 2016/0373643 | A1* | 12/2016 | Abe | H04N 5/23212 |

FOREIGN PATENT DOCUMENTS

JP 2013-054120 3/2013

* cited by examiner

*Primary Examiner* — Jason A Flohre
(74) *Attorney, Agent, or Firm* — John C. Pokotylo; Pokotylo Patent Services

(57) ABSTRACT

A focus detection apparatus, comprising, focus detection pixels that receive a pair of light fluxes resulting from pupil division of light flux, a memory that stores correction values in accordance with width of the imaging light flux in the pupil-division direction relating to a two-image interval value, and a controller having a focus detection section, a light flux width calculation section, and a defocus amount calculation section, wherein the light flux width calculation section calculates the width of the imaging light flux in the pupil-division direction, and the defocus amount calculation section calculates defocus amount of the photographing optical system based on the two-image interval value, wherein the focus detection section detects a first two-image interval value and corrects the first two-image interval value based on the correction values and the width of the imaging light flux in the pupil-division direction to obtain a second two-image interval value.

9 Claims, 14 Drawing Sheets

(b)

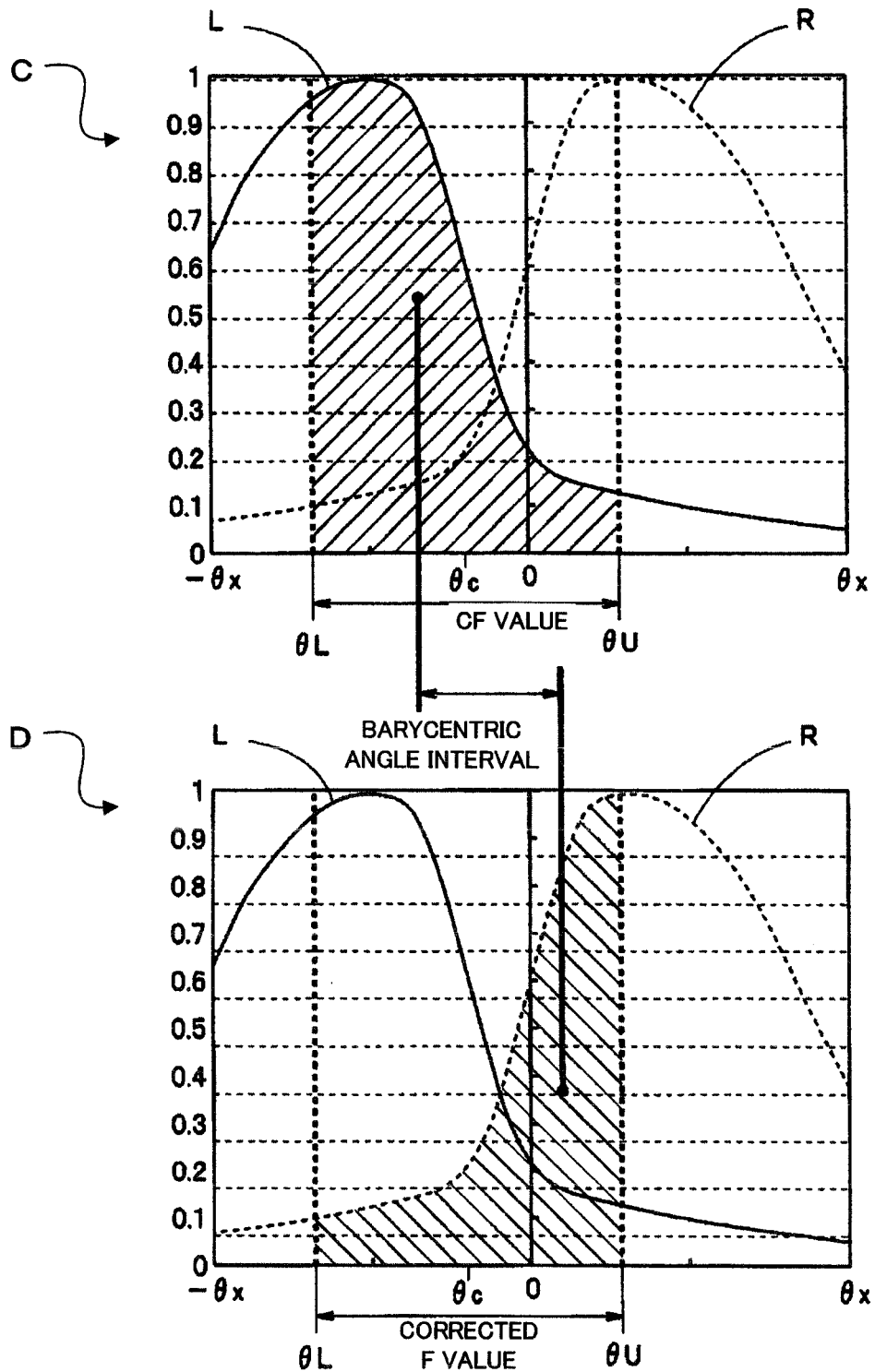

FIG. 11A

| WIDTH IN PUPIL-DIVISION DIRECTION[deg] | CORRECTION COEFFICIENT | | | |
|---|---|---|---|---|
| | 3RD ORDER | 2ND ORDER | 1ST ORDER | 0TH ORDER |
| 30 | A3 | A2 | A1 | A0 |
| 25 | 1.86A3 | 1.79A2 | 1.65A1 | 1.58A0 |
| 20 | 3.00A3 | 2.82A2 | 2.00A1 | 1.80A0 |
| 15 | 4.86A3 | 4.52A2 | 2.19A1 | 1.81A0 |
| 10 | 7.43A3 | 6.94A2 | 2.15A1 | 1.41A0 |
| 5 | 7.57A3 | 6.82A2 | 1.68A1 | 0.90A0 |

FIG. 11B

| F VALUE | CORRECTION COEFFICIENT |
|---|---|
| | 1ST ORDER |
| 1.4 | B1 |
| 2.0 | 1.80B1 |
| 2.8 | 2.47B1 |
| 4.0 | 2.94B1 |
| 5.6 | 2.99B1 |
| 8.0 | 2.51B1 |

FOCUS DETECTION APPARATUS AND FOCUS DETECTION METHOD

CROSS-REFERENCE TO RELATED APPLICATIONS

Benefit is claimed, under 35 U.S.C. § 119, to the filing date of prior Japanese Patent Application No. 2016-124564 filed on Jun. 23, 2016. This application is expressly incorporated herein by reference. The scope of the present invention is not limited to any requirements of the specific embodiments described in the application.

BACKGROUND OF THE INVENTION

1. Field of the Invention

The present invention relates to a focus detection apparatus and a focus detection method, and more particular to a focus adjustment device and a focus detection method for carrying focus adjustment using a phase difference AF method, based on output of an image sensor that has imaging pixels and focus detection pixels.

2. Description of the Related Art

A focus detection device, that forms a subject image that has been formed using an photographing optical system having focus detection pixels arranged at some parts within a two dimensional array of imaging pixels, and also carries out focus adjustment for the photographing optical system using a pupil-division phase difference method, is known. This focus detection device that uses the pupil-division phase difference method divides exit pupils of the photographing optical system into left and right (or top and bottom) by receiving a pair of light fluxes using apertures provided for each focus detection pixel, or using photoelectric conversion sections that are divided into a plurality provided for each focus detection pixel, and obtains an image spacing between two images formed by the light flux that has passed through the respective pupils. This image spacing is converted to a defocus amount (focus lens drive amount) using barycentric angular interval (AF sensitivity) at the time of pupil division.

Correlation calculation is used in obtaining the image spacing for the two images described above. However, if pupil-division is carried out using focus detection pixels, the left and right pupils become asymmetrical, and the two images formed having passed through the pupils are also asymmetrical. If correlation calculation is carried out using these two asymmetrical images, an error in obtaining two-image interval will become large in accordance with size of the defocus amount.

Therefore, with the focus detection device disclosed in Japanese patent laid open number 2013-054120 (hereafter referred to as "patent publication 1") error is reduced by using switching between a first AF sensitivity that uses a coefficient, for converting from a two-image interval value to a defocus amount, close to the in-focus position, and a second AF sensitivity that is used in a state of significant defocus.

SUMMARY OF THE INVENTION

A focus detection apparatus of a first aspect of the present invention comprises, focus detection pixels that receive a pair of light fluxes resulting from pupil division of light flux that has passed through a photographing optical system, and a memory that stores correction values in accordance with width of the imaging light flux in the pupil-division direction relating to a two-image interval value, and a controller having a focus detection section, a light flux width calculation section, and a defocus amount calculation section, wherein the focus detection section detects a two-image interval value in the pupil-division direction, based on output of the focus detection pixels, the light flux width calculation section calculates width of the imaging light flux in the pupil-division direction based on optical information of the photographing optical system, and the defocus amount calculation section calculates defocus amount of the photographing optical system based on the two-image interval value, wherein the focus detection section detects a first two-image interval value, and obtains a second two-image interval value by correcting the first two-image interval value based a correction value stored in the memory and width of the imaging light flux in the pupil-division direction calculated by the light flux width calculation section, and the defocus amount calculation section calculates defocus amount based on the second two-image interval value.

A focus detection method of a second aspect of the present invention is a focus detection method for a focus detection apparatus provided with focus detection pixels that receive a pair of light fluxes resulting from pupil division of light flux that has passed through a photographing optical system, a memory for storing correction values in accordance with width of the imaging light flux in the pupil-division direction of the photographing optical system, the focus detection method comprising, calculating width in the pupil-division direction of the imaging light flux based on optical information of the photographing optical system, calculating a two-image interval value pupil-division for the based on output of the focus detection pixels as a first two-image interval value, calculating a second two-image interval value by correcting the first two-image interval value based on a correction value stored in the memory and a light flux width that has been calculated, and calculating defocus amount of the photographing optical system based on the second two-image interval value.

A non-transitory computer-readable medium of a third aspect of the present invention, storing a processor executable code, which when executed by at least one processor included in a focus detection apparatus, performs a focus detection method, the focus detection apparatus comprising: focus detection pixels that receive a pair of light fluxes resulting from pupil division of light flux that has passed through a photographing optical system, and a memory for storing correction values in accordance with width of the imaging light flux in the pupil-division direction of the photographing optical system, the focus detection method comprising, calculating width in the pupil-division direction of the imaging light flux based on optical information of the photographing optical system, calculating a two-image interval value pupil-division for the based on output of the focus detection pixels as a first two-image interval value, calculating a second two-image interval value by correcting the first two-image interval value based on a correction value stored in the memory and a light flux width that has been calculated, and calculating defocus amount of the photographing optical system based on the second two-image interval value.

BRIEF DESCRIPTION OF THE DRAWINGS

FIG. 7 is a drawing for explaining a relationship between AF sensitivity and imaging light flux incident angle range of focus detection pixels of image height X that are not on the optical axis, and AF sensitivity, with the one embodiment of the present invention.

FIG. 11A and FIG. 11B are tables showing correction coefficients for each width of the imaging light flux in the pupil-division direction, in one embodiment of the present invention.

DETAILED DESCRIPTION OF THE PREFERRED EMBODIMENTS

An example where a digital camera (hereafter abbreviated to "camera") is adopted as one embodiment of the present invention will be described in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Image data that has been stored in the storage medium can be played back and displayed on the display section if playback mode is selected.

Also, the imaging section of the camera of this embodiment has focus detection pixels arranged at some parts within a two-dimensional array of imaging pixels, and images a subject image that has been formed by the photographing optical system. Defocus amount of a focus lens of the photographing optical system is detected with a pupil-division phase difference method, using pixel data from the focus detection pixels. Width of the imaging light flux in the pupil-division direction is calculated based on optical information of the photographing optical system, a correction value corresponding to this width is obtained by table reference, and correction calculation is carried out for the calculated defocus amount described above using this correction value, to obtain a final defocus amount.

Preferred embodiments using a camera to which the present invention has been applied will be described in the following in accordance with the drawings. Before describing the specific structure of this embodiment, AF sensitivity used for focus detection, and causes of variation in AF sensitivity will be described.

Figure 1:
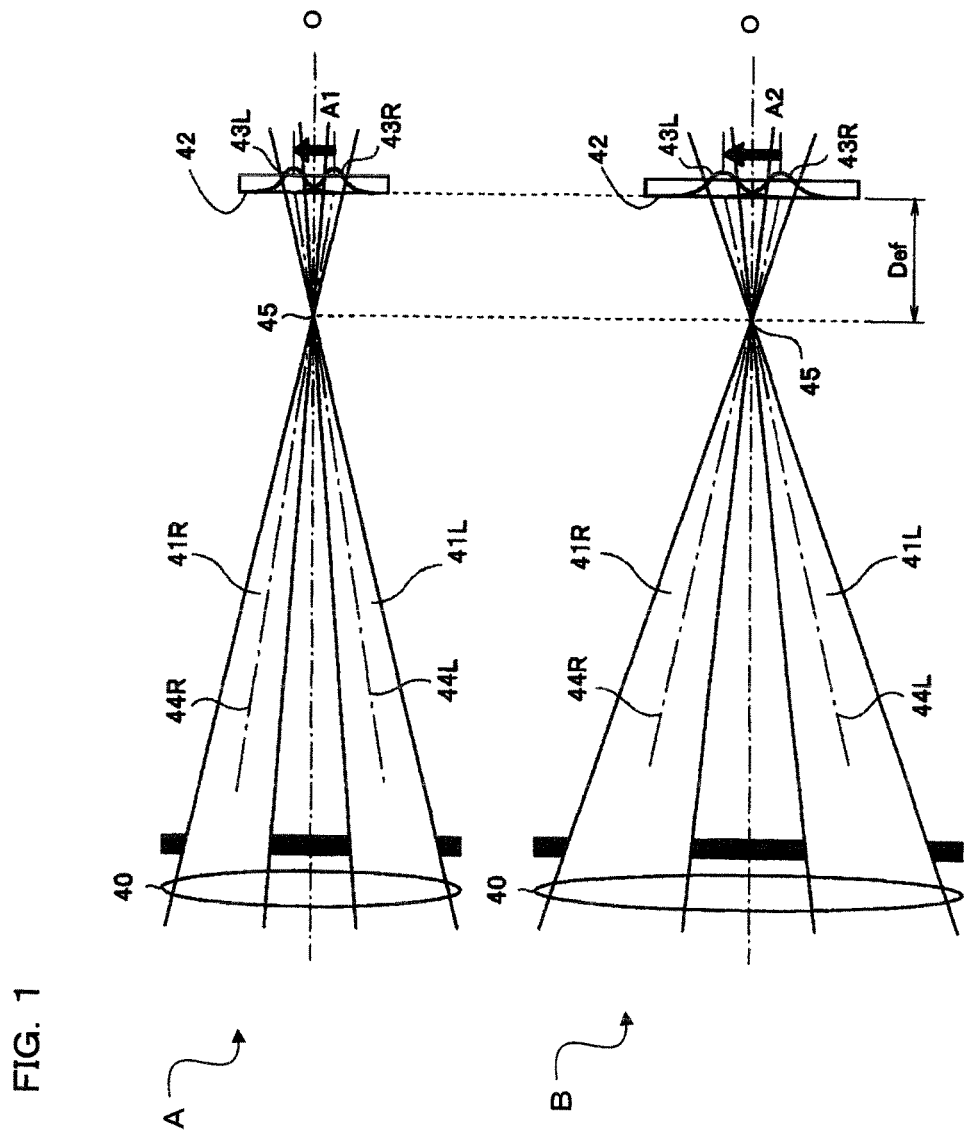
FIG. 1 is a drawing for explaining a relationship between F value (F number, F. No) and 2 images in a pupil-division phase difference method, with one embodiment of the present invention.

FIG. 1 is a drawing for explaining a relationship between F value (F number) and two-image interval, in a pupil-division phase difference method. A, at the upper half of FIG. 1, shows an example for a case where F value is large, while B at the lower half of FIG. 1 shows an example for a case where F value is small. FIG. 1 shows appearance when right luminous flux 41R and left luminous flux 41L used in a pupil-division phase difference method are incident on an imaging surface 42. In FIG. 1 apertures are depicted on the optical axis in the vicinity of a lens since it is a theoretical description, but in actual fact there is means (with this embodiment, micro lenses) for dividing light flux for pupil-division within the image sensor.

In a pupil-division phase difference method, each light path from a subject is divided into a left direction and a right direction, for example, at exit pupils, and light flux from the right direction (right light flux) and light flux from a left direction (left light flux) is incident on an imaging surface (light receiving surface) of the image sensor. Pixels for receiving the right light flux (hereafter referred to as R pixels) and pixels for receiving the left light flux (hereafter referred to as L pixels) are provided on the image sensor, and the left light flux and right light flux are respectively imaged on respective imaging surfaces of the R pixels and the L pixels.

In FIG. 1, a right image 43R resulting from right luminous flux 41R incident via the lens 40 is acquired using R pixels, and a left image 43L resulting from left luminous flux 41L is obtained using L pixels. An amount of displacement and direction of displacement between the right image 43R and the left image 43L on the imaging surface 42 corresponds to defocus amount and defocus direction. A distance on the imaging surface 42 between a principal beam 44R of the right luminous flux 41R and a principal beam 44L of the left luminous flux 41L is a two-image interval A1 (shown by the filled arrow), and the two-image interval A1 is proportional to a distance between the imaging surface 42 and focal point 45 (defocus amount). This proportionality coefficient is AF sensitivity, and if AF sensitivity for the upper half A in FIG. 1 is made α1, then defocus amount Def can be represented by Def=α1×A1.

The two-image interval can be obtained from outputs of the R pixels and the L pixels, and so if AF sensitivity is obtained it is possible to calculate defocus amount. AF sensitivity can be obtained from AF operation parameters based on characteristics of the lens and the image sensor.

The lower half B of FIG. 1 shows an example of a case where effective aperture of the lens 40 has been changed compared to the upper half A of FIG. 1. Examples are shown where defocus amount Def in the lower half B of FIG. 1 coincides with the defocus amount Def in the upper half A of FIG. 1. If a two-image interval for the lower half B in FIG. 1 is made A2 and AF sensitivity obtained from AF operation parameters is made α2, then the defocus amount def can be represented by Def=α2×A2.

The examples shown in FIG. 1 show that the two-image interval changes in accordance with F value even if defocus amount Def is constant. Specifically, the examples of FIG. 1 show that AF sensitivity changes in accordance with F value, and show that it is possible to use effective aperture information, for example F value, as AF operation parameters for obtaining AF sensitivity. With the examples of FIG. 1, it is possible to calculate defocus amount from information on the two-image interval and the F value.

However, the F value is defined by a light beam on the optical axis. This means that with this embodiment, to express effective aperture of light flux for focus detection pixels that are located off the optical axis, information on a value for F value equivalent (corrected F value) is used as an AF operation parameter for any peripheral light flux.

Figure 2A:
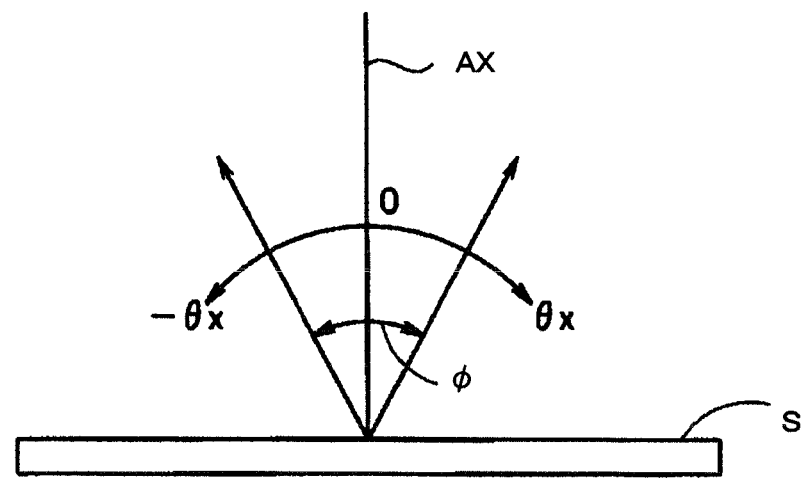
FIG. 2A and FIG. 2B are drawings for explaining a sensitivity characteristic of focus detection pixels with the one embodiment of the present invention.
Figure 2B:
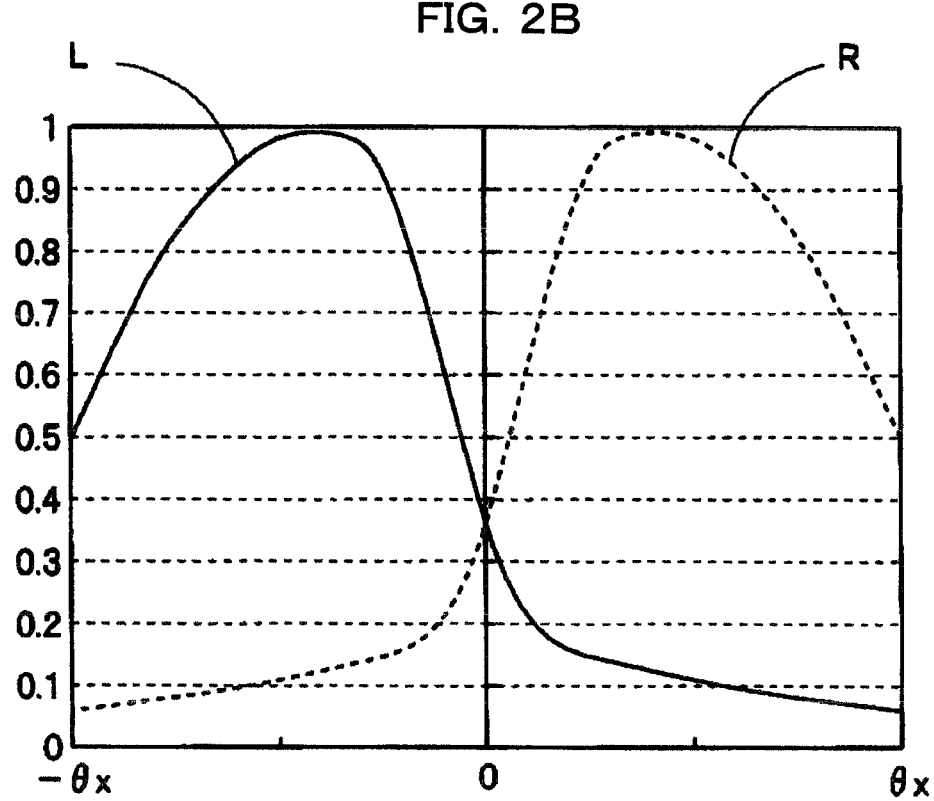

FIG. 2A and FIG. 2B are explanatory drawings for describing light receiving sensitivity characteristics of the focus detection pixels. FIG. 2A shows a range of incident angle (ray incident angle θx), in a pupil-division direction, for light flux (imaging light flux) incident on a light receiving surface. As shown in FIG. 2A, a ray incident angle θx is shown as an angle in positive and negative directions between an axis that is perpendicular to the light receiving surface and the ray incident angle, with an axis that is perpendicular to the light receiving surface S made 0°. It should be noted that φ shows an incident range for imaging light flux.

FIG. 2B respectively shows light receiving sensitivity characteristics for L pixels that receive left light flux that has passed through a left pupil and R pixels that receive right light flux that has passed through a left pupil as a solid line L and a dashed line R, the horizontal axis representing ray incident angle θ and the vertical axis representing light receiving sensitivity. FIG. 2B shows light receiving sensitivity characteristics of focus detection pixels positioned on the optical axis, and light receiving sensitivity characteristics for L pixels and R pixels are substantially left-right symmetrical about a ray incident angle θ.

Figure 3:
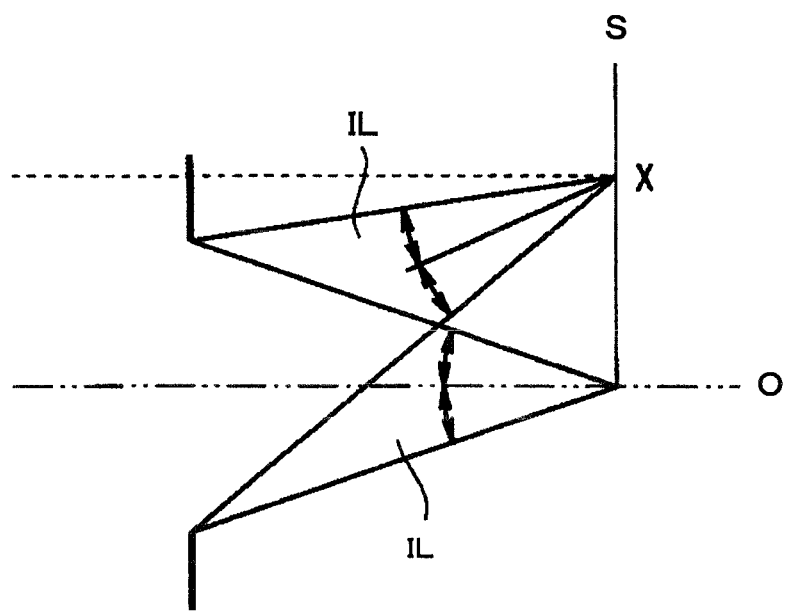
FIG. 3 is a drawing for explaining states of incident angle of imaging light flux on off-axis focus detection pixels, in one embodiment of the present invention.

As shown in FIG. 3, there may be cases where light flux that is off-axis (imaging light flux IL corresponding to light receiving surface X) is inclined with respect to the optical axis O. With AF operation that uses these types of off-axis focus detection pixels, it is necessary to calculate an AF sensitivity that is different to the AF sensitivity used for light flux on the optical axis. In order to calculate AF sensitivity, a range of light flux is obtained, but it is not possible to acquire appropriate AF sensitivity using only a corrected F value representing width of the light flux, and a value that represents the inclination of the light flux is also necessary.

Light receiving sensitivity of the focus detection pixels has an angular characteristic in the pupil-division direction. With this embodiment, AF sensitivity is calculated from angular range of the imaging light flux and angular characteristic of the focus detection pixels. Specifically, with this embodiment, information on the sensitivity of the L and R pixels, and information relating to angular range of imaging light flux that is incident on the L and R pixels (corrected F value representing width of the light flux, and inclination of the light flux) are used as AF operation parameters for obtaining appropriate AF sensitivity.

Figure 4:
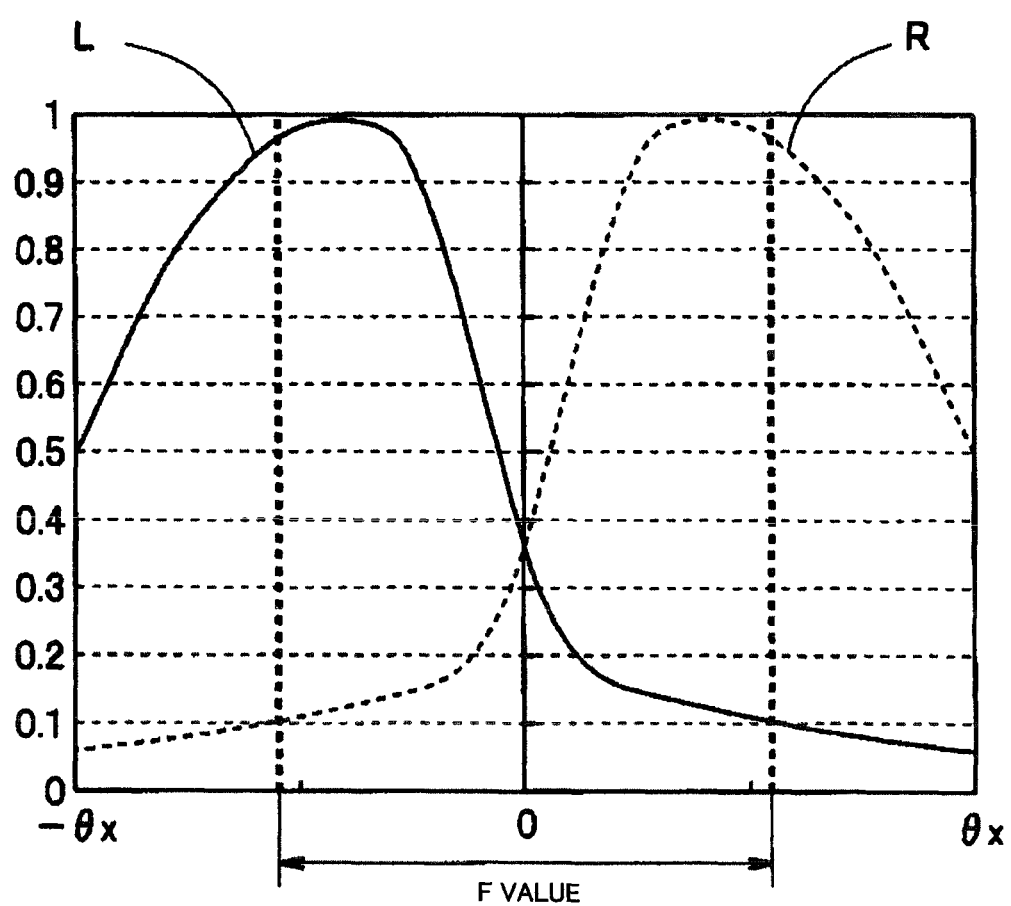
FIG. 4 is a drawing for explaining a relationship between imaging light flux angle range and AF sensitivity, for focus detection pixels that are on the optical axis, with the one embodiment of the present invention.
Figure 5:
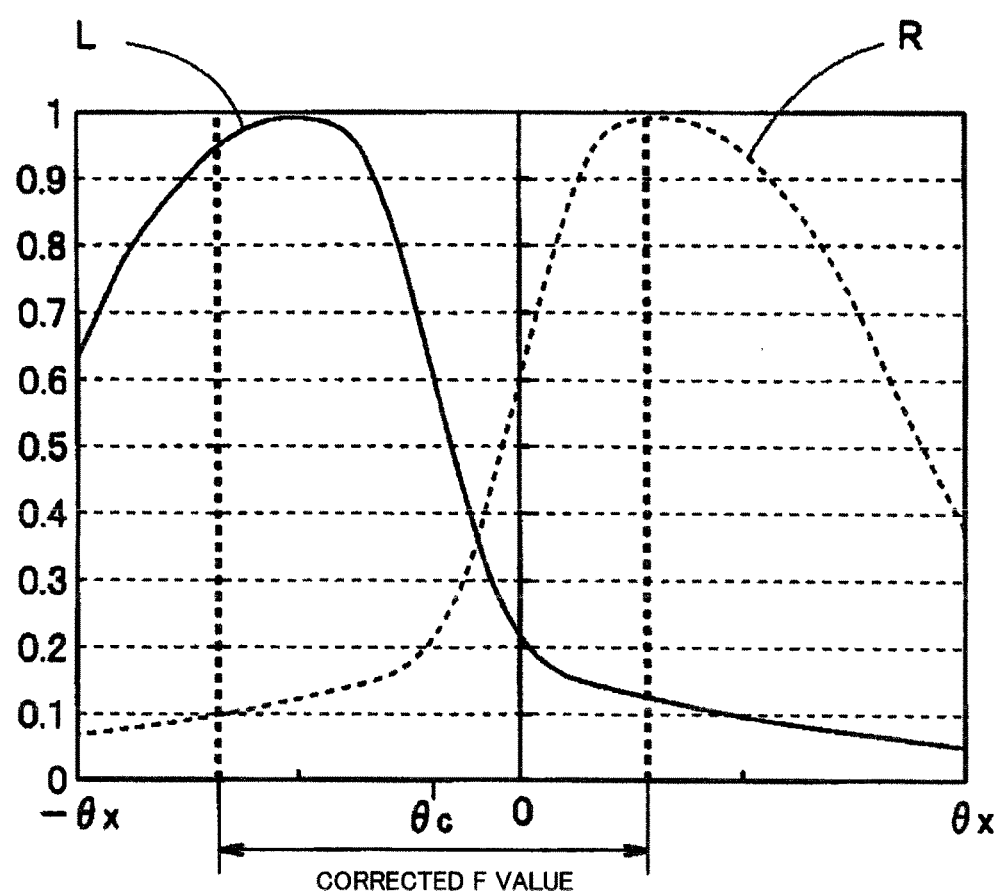
FIG. 5 is a drawing for explaining a relationship between imaging light flux angle range and AF sensitivity, for off-axis focus detection pixels, with the one embodiment of the present invention.
Figure 6A:
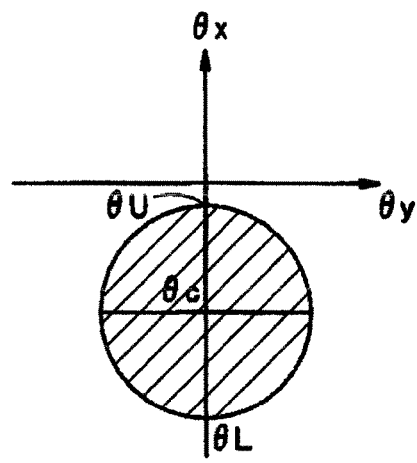
FIG. 6A and FIG. 6B are drawings for explaining effective aperture and imaging light flux incident angle θc, which is a central direction of imaging light flux, for incident light flux that is incident on focus detection pixels of image height X, with the one embodiment of the present invention.
Figure 6B:
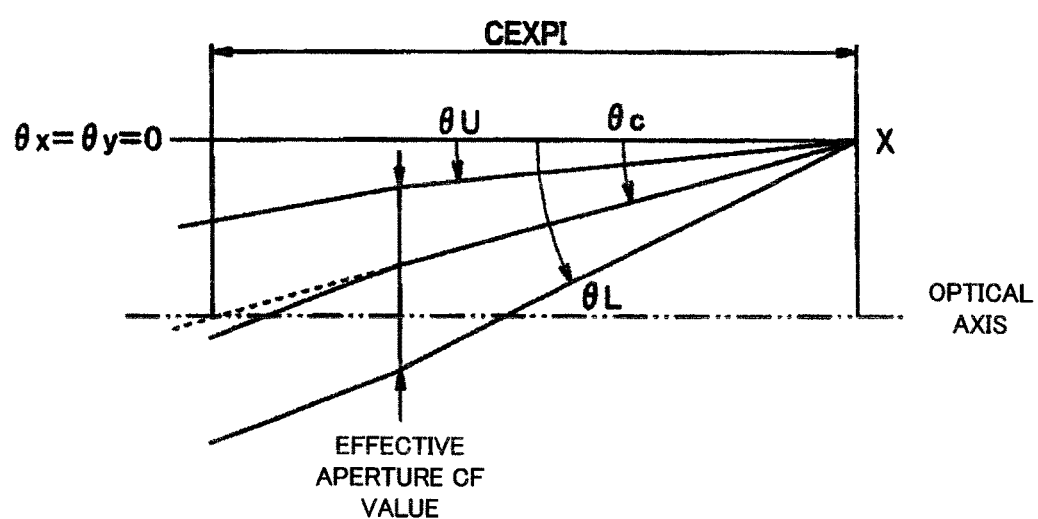

FIG. 4 and FIG. 5 are explanatory drawings for describing a relationship between angular range of imaging light flux and AF sensitivity. FIG. 5 shows a relationship for focus detection pixels that are on the optical axis, while FIG. 6A and FIG. 6B show the relationship for off-axis focus detection pixels, and for focus detection pixels that are off the optical axis a light receiving sensitivity characteristic for L pixels and R pixels is a non-symmetrical characteristic.

As shown in FIG. 4, imaging light flux in an angular range shown by the thick dashed line, for example, is incident on the focus detection pixels that are on the optical axis. As shown in FIG. 4, this imaging light flux is left right symmetrical with respect to the optical axis, and an angle difference between maximum incident angle and minimum incident angle corresponds to F value.

Also, maximum incident angle and minimum incident angle of imaging light flux for off-axis focus detection pixels are shifted in accordance with image height X shown in FIG. 3, resulting in an angular range shown by the thick dashed lines in FIG. 5, for example. It should be noted that while angle difference between maximum incident angle and minimum incident angle of the imaging light flux in this case actually corresponds to corrected F value, this has been omitted from FIG. 3. This means that it is possible to acquire information on maximum incident angle and a minimum incident angle of the imaging light flux using the corrected F value and incident angle of a ray that passes through the center of the imaging light flux (hereafter referred to as imaging light flux incident angle).

With this embodiment, in order to make computation simple, a range of light flux that is incident on the focus detection pixels is obtained using information on the corrected F value and the imaging light flux incident angle (central direction of the imaging light flux), and AF sensitivity is obtained using this range. In this case, due to the effects of aberration of an optical system between the aperture and the light receiving surface etc., incident angle of the imaging light flux that is incident on the imaging surface at a specified image height differs for each optical system. With this embodiment, therefore, information on imaging light flux incident angle corresponding to image height of the light receiving surface, that is acquired for the optical system, is used as an AF operation parameter.

FIG. 6A and FIG. 6B are explanatory drawings for explaining effective aperture (corrected F value) and imaging light flux incident angle θc, which is a central direction of imaging light flux, for incident light flux that is incident on focus detection pixels of image height X. FIG. 6A shows angular range of a pupil seen from image height X. In the image height X direction the imaging light flux exists in a range from incident angle $θ_L$ to $θ_U$, and the center of the range is imaging light flux incident angle θc.

Further, ray incident angle to the light receiving surface has a one-to-one correspondence to a position of an intersection point of a ray that passes through the center of the imaging light flux (the dashed line in FIG. 6B) and the optical axis. A rate of change in this position is comparatively small compared to rate of change of the imaging ray incident angle θc. This enables high precision control with a comparatively small number of bits, by using information on this position instead of the information on the imaging light flux incident angle θc. With this embodiment, this position, namely a position where a straight line passing through the center of the imaging light flux crosses the optical axis, will be referred to hereafter as corrected exit pupil position (CEXPI). It should be noted that this position is different from exit pupil position that is defined as a paraxial amount.

The corrected exit pupil position (CEXPI) can be expressed by the following equation (1), and corrected F value (CF value) can be expressed by the following equation (2).

Tan θc=(Tan θU+Tan θL)/2

CEXPI=x/Tan θc  (1)

CF=Tan θL−Tan θU  (2)

Thus, with this embodiment, the corrected F value (CF value) and information on corrected exit pupil position (CEXPI) that has been corrected in accordance with image height are used as the AF operation parameters. These items of information have different values for each optical system, and so information from the optical system is utilized. Also, since, depending on the value of the imaging light flux incident angle θc, the corrected exit pupil position (CEXPI) may become infinity, a reciprocal value of the corrected exit pupil position (CEXPI) is preferably used as AF operation parameter.

With this embodiment, information on corrected F value (CF value) that has been corrected in accordance with image height and corrected exit pupil position (CEXPI) that has been corrected in accordance with image height are used as AF operation parameters at the camera lens side, and a light receiving sensitivity characteristic of the focus detection pixels is used as the AF operation parameter at the camera body side. The AF operation parameters at the lens side are values that are inherent to the lens side based on optical design, while the AF operation parameters at the body side are values inherent to the body side based on design of the image sensor. Accordingly, by respectively holding these AF operation parameters at the lens side and the body side, it is possible to use the lens side and body side AF operation parameters even in a case where the type of the lens side and the body side is changed, and high precision AF operation becomes possible.

FIG. 7 is a drawing for explaining a relationship between light receiving sensitivity and imaging light flux incident angle range, and AF sensitivity, of focus detection pixels of image height X that are not on the optical axis. A solid line L represents light receiving sensitivity of the L pixels, and a dashed line R represents light receiving sensitivity of the R pixels. Imaging light flux is incident on the focus detection pixels shown by the sensitivity characteristic of FIG. 7 in an angular range of the heavy dashed lines. Specifically, FIG. 7 shows that the imaging light flux is incident only in an angular range corresponding to the corrected F value (CF value), with imaging light flux incident angle θc as a center.

Light receiving amount for the L pixels can be represented by the shaded area in the graph C in the upper part of FIG. 7. Also, light receiving amount for the R pixels can be represented by the shaded area of the graph D in the lower part of FIG. 7. It can be considered that a barycentric position of the shaded region in graph C of FIG. 7 corresponds to incident direction of the left light flux, while a barycentric position of the shaded region in graph D of FIG. 7 corresponds to incident direction of the right light flux. An angular interval between these barycentric positions (barycentric angular interval) can be considered to be proportional to AF sensitivity.

Specifically, barycentric angles GL and GR can be represented by equations (3) and (4) below, and AF sensitivity Saf can be represented by the equation (5) below in which interval of barycentric angles has been multiplied by a given constant A. Here, light receiving sensitivity characteristics for the L pixels and R pixels are respectively made fL and fR. It should be noted that in actual fact, as shown by the shaded area in FIG. 6A, since light flux has two dimensions of θx and θy, barycentric angle GL is represented by equation (6) (the same is true for barycentric angle GR and so this has been omitted).

$$GL = \frac{\int_{\theta L}^{\theta U} f_L(\theta x) \cdot \theta x \cdot d\theta x}{\int_{\theta L}^{\theta U} f_L(\theta x) \cdot d\theta x} \quad (3)$$

$$GR = \frac{\int_{\theta L}^{\theta U} f_R(\theta x) \cdot \theta x \cdot d\theta x}{\int_{\theta L}^{\theta U} f_R(\theta x) \cdot d\theta x} \quad (4)$$

$$Saf = |GL - GR| \times A \quad (5)$$

$$GL = \frac{\int\int_{\theta L}^{\theta U} f_L(\theta x, \theta y) \cdot \theta x \cdot \theta y \cdot d\theta x \cdot d\theta y}{\int\int_{\theta L}^{\theta U} f_L(\theta x, \theta y) \cdot d\theta x \cdot d\theta y} \quad (6)$$

It should be noted that FIG. 7 shows light receiving sensitivity characteristics for focus detection pixels of a given image height, but the light receiving sensitivity characteristic of the focus detection pixels changes in accordance with image height. Accordingly, at the body side information on the light receiving sensitivity characteristic for focus detection pixels of each image height is stored, and utilized.

Also, surface area of the shaded regions of graphs C and D in FIG. 7 correspond to received light amounts of each of the L and R pixels. If there is a difference in received large amount of L and R pixels for the same subject, then an L image based on the L pixels and an R image based on the R pixels will be different, making detection of a two-image interval difficult. Detection of the two-image interval is therefore made easy by subjecting L and R image signals to luminance correction (shading correction) in accordance with surface area of the shaded regions of graphs C and D in FIG. 7.

Surface area SL of the shaded portion of graph C in FIG. 7 and surface area SR of the shaded portion of graph D in FIG. 7 can be represented by equations (7) and (8) below, and a luminance correction coefficient (ICC) can be represented by equation (9) below, for example. Luminance correction is carried out by multiplying output of the L pixels by this luminance correction coefficient (ICC). It should be noted that in actual fact, as shown by the shaded area of FIG. 6A, since light flux has two dimensions of θx and θy, surface area SL is represented by the equation (10) (the same applies to the surface area X, and so this is omitted).

$$SL = \int_{\theta L}^{\theta U} f_L(\theta x) \cdot d\theta x \quad (7)$$

$$SR = \int_{\theta L}^{\theta U} f_R(\theta x) \cdot d\theta x \quad (8)$$

$$ICC = SR/SL \quad (9)$$

$$SL = \iint f_L(\theta x, \theta y) \cdot d\theta x \cdot d\theta y \quad (10)$$

Figure 8A:
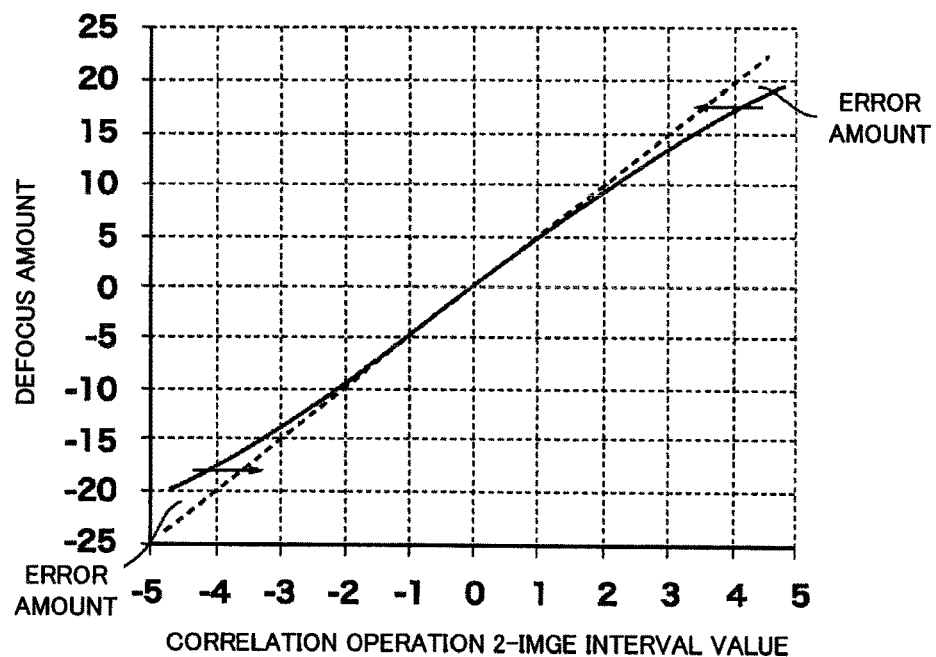
FIG. 8A and FIG. 8B are graphs showing a relationship between two-image interval value used in correlation calculation, and error, in one embodiment of the present invention.

Next, a relationship between defocus amount error, and a two-image interval value that has been obtained by correlation calculation, will be described using FIG. 8A and FIG. 8B. In FIG. 8A, the horizontal axis is two-image interval value while the vertical axis is defocus amount, with a solid line being defocus amount that has been calculated by multiplying the two-image interval value by AF sensitivity, and the dashed line being defocus amount. A difference between the dashed line and the solid line represents an error amount, and for the same defocus amount a difference between the two-image interval value corresponding to the solid line (including error) and the two-image interval value corresponding to the dashed line (ideally not including error), represents detection error of the two-image interval value. Also, for the same two-image interval value, it shows that the difference between defocus amount corresponding to the solid line (including error), and defocus amount corresponding to the dashed line (not including error), constitutes focus error arising in AF results based on two-image interval value including this error. This error is reduced by correcting the two-image interval value.

In FIG. 8A, defocus amount is acquired by multiplying the two-image interval value by AF sensitivity, and so, in so much as AF sensitivity is a constant value, becomes a linear relationship, as shown by the dashed line in FIG. 8A. However, as was described previously, an exit pupil of the photographing optical system that has been divided using the focus detection pixels becomes a left right asymmetrical pupil shape. Shapes of two images formed through this pupil constitute shapes having significant defocus amount and also increased asymmetry. If correlation calculation is carried out using two images having this type of significant asymmetry, the effect of error on the calculation results will be significant. This will be described in detail later. Therefore, as shown in FIG. 8A, in a region where defocus amount is large such as when two-image interval value becomes large, since error due to asymmetry included in the two-image interval value is increased, an error amount for calculated defocus amount becomes large.

Figure 8B:
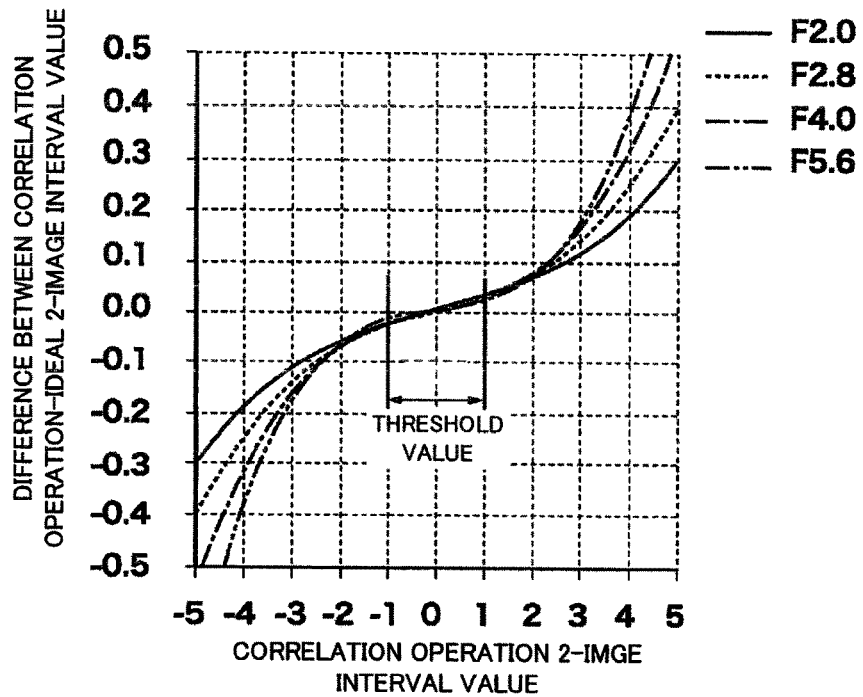

This error amount also differs depending on aperture value (F value) of the photographing optical system, as shown in FIG. 8B. With the example shown in FIG. 8B, the horizontal axis, as in FIG. 8A, is two-image interval value calculated using correlation calculation, and the vertical axis is a difference (specifically, error amount) between two-image interval value using correlation calculation and ideal two-image interval value obtained from AF sensitivity and real defocus amount. As will be understood from FIG. 8B, as aperture value increases, so error amount increases. However, in a range where two-image interval value is small, particularly within a threshold value range, the error amount becomes small irrespective of the aperture value. This point will be described using FIG. 9A, FIG. 9B, FIG. 10A, and FIG. 10B.

Figure 9A:
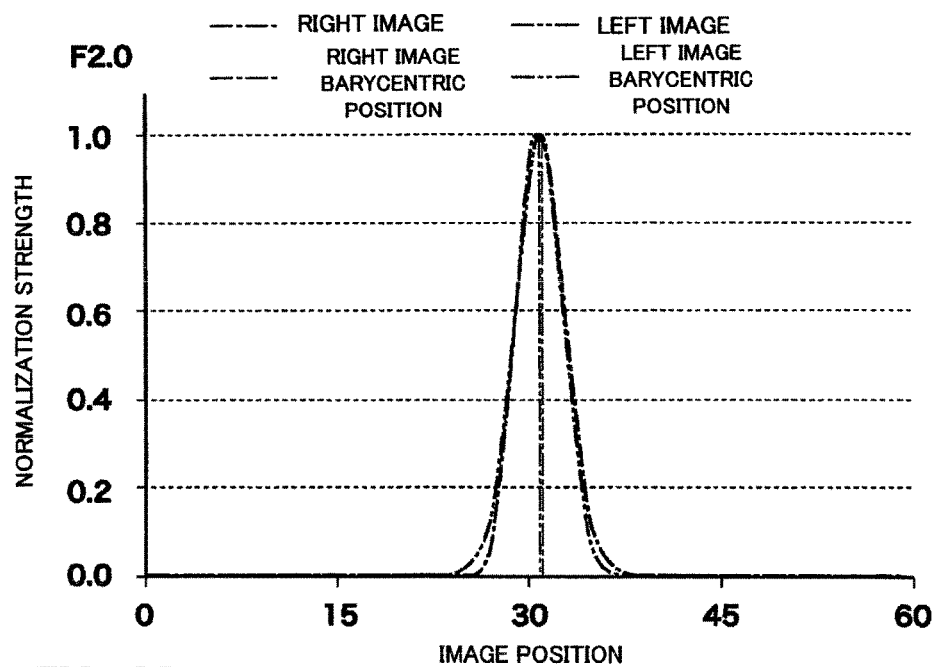
FIG. 9A and FIG. 9B are graphs showing a relationship between aperture value, two-image interval value used in correlation calculation, and error, in one embodiment of the present invention.
Figure 9B:
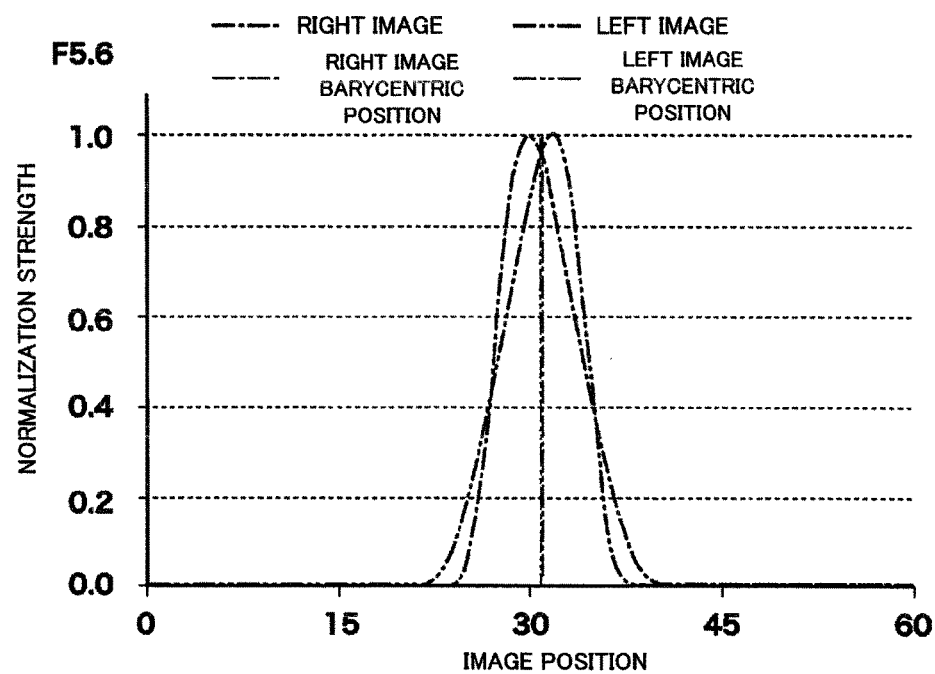
Figure 10A:
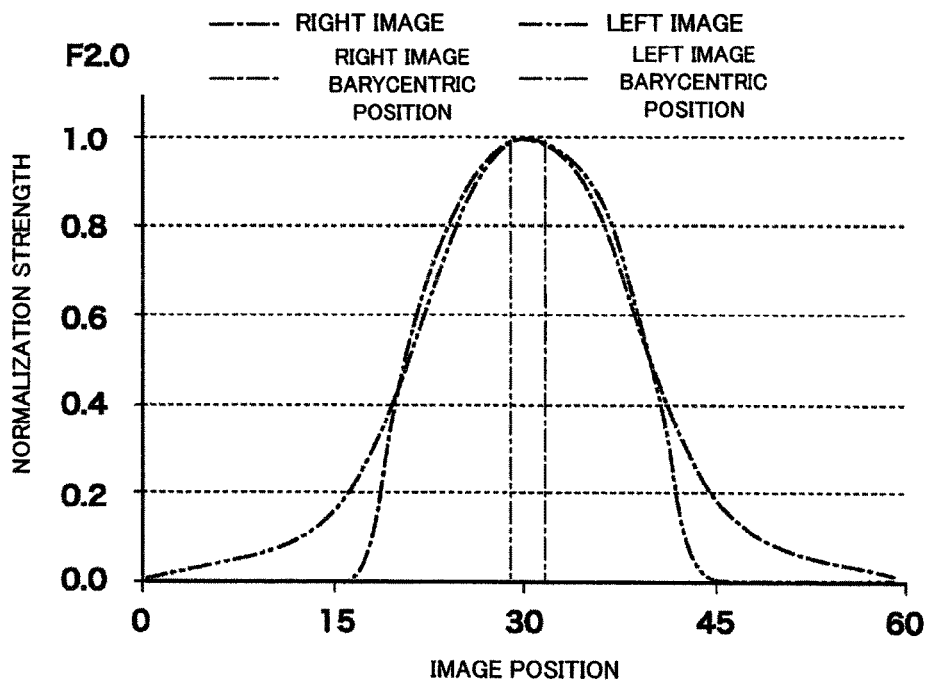
FIG. 10A and FIG. 10B are graphs showing a relationship between two-image interval value used in correlation calculation, and error, in a case where two-image interval is large, in one embodiment of the present invention.
Figure 10B:
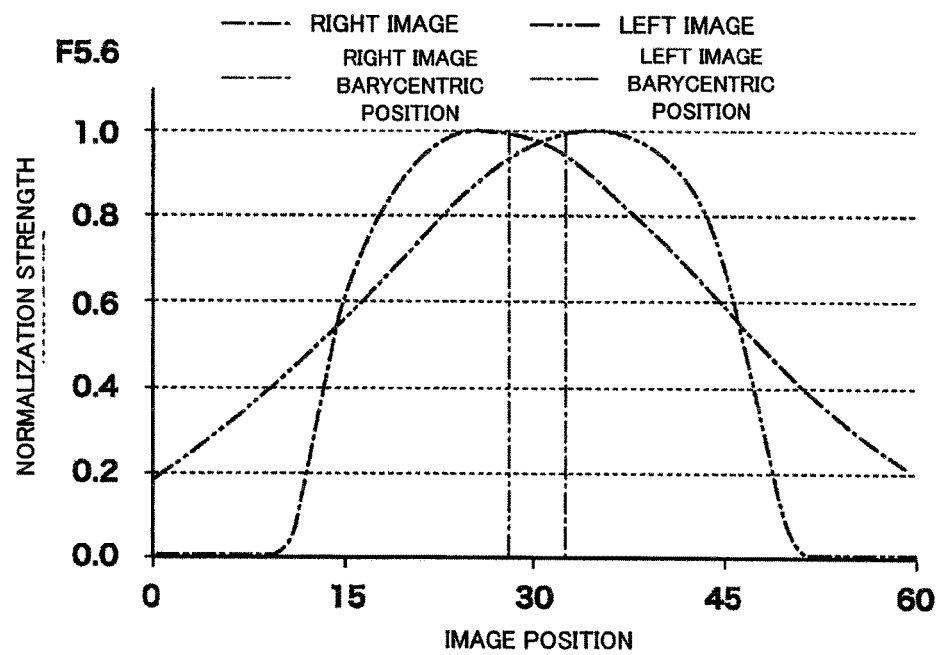

FIG. 9A and FIG. 9B, and FIG. 10A and FIG. 10B, show a right image that has been formed by light flux divided to the right side by a pupil and a left image that has been formed by light flux that has been divided to the left side, in the case of a point image subject, and images are displaced to the side (pupil-division direction) so that a left right correlation value becomes a minimum value. FIG. 9A and FIG. 9B are for a case where defocus amount is small (a case where the error amount in FIG. 8B is within a threshold value range), while FIG. 10A and FIG. 10B are for a case where defocus amount is large (a case where the error amount in FIG. 8B is outside a threshold value range).

FIG. 9A is a case where aperture value is F2.0 and FIG. 9B shows a case where aperture value is F5.6, and defocused states are established such that two-image interval values due to respective correlation calculations become the same value. That is, FIG. 9A and FIG. 9B show states where the left image and the right image have been shifted so that correlation between the right image and the left image becomes highest, in a case where the same two-image interval value is obtained from respective correlation calculations. The dashed line in FIG. 9A and FIG. 9B shows barycentric position obtained from barycentric angular interval of the left and right pupils. Barycentric positions of the right image and the left image coincide, in the case where aperture value F2.0, and in the case where aperture value is F5.6. In the case of F5.6, symmetries of the shapes of the right image and left image are different compared to with F2.0, but there is almost no variation in barycentric position due to this difference. That is, in the event that two-image interval value is small it is possible to calculate two-image interval value at the time centroids of the left image and the right image coincide, irrespective of aperture value, and two-image interval value error is extremely small.

FIG. 10A and FIG. 10B show defocused states where, as was described previously, two-image interval value becomes larger than in the case shown in FIG. 9A and FIG. 9B. Shapes of the right image and left image left right asymmetrical, and barycentric position differs between the right image and the left image. FIG. 10A is a case where aperture value is F2.0, while FIG. 10B shows a case where aperture value is F5.6. As will be understood from the drawings, a barycentric position interval difference is larger in the case of F5.6 than for F2.0. Specifically if the two-image interval value becomes large degree of asymmetry of shapes of the left and right images becomes large, and as a result difference in barycentric position becomes larger even with the same two-image interval value. Accordingly, in a case where the two-image interval value is large detection error for the two-image interval value becomes large, and defocus amount error becomes large. The error amount also becomes larger in accordance with aperture value.

Accordingly, with this embodiment, in a case where two-image interval value that has been calculated using correlation calculation is larger than a threshold value, correction is carried out on the two-image interval value so as to eliminate this type of error. Details of this correction calculation will describe later (refer to S35 in FIG. 14 which we described later), but in summary, the correction is carried out by multiplying the two-image interval value by a correction coefficient. Correction coefficients are held in a table in accordance with width of the imaging light flux in the pupil-division direction from the photographing optical system. It should be noted that the pupil-division direction is the same as the array direction of the focus detection pixels.

FIG. 11A and FIG. 11B show one example of correction coefficient. The example shown in FIG. 11A is a coefficient for a case of approximation with a third order function in correction calculation for the two-image interval value, and FIG. 11B is a coefficient for the case of approximation with a first order function in correction calculation for the two-image interval value. FIG. 11A is third order to zero order correction coefficients made into a table in accordance with width of the imaging light flux in the pupil-division direction. Also, FIG. 11B is a first-order correction coefficient made into a table in accordance with F value of the photographing lens.

These correction coefficients are stored in a body memory 28, which will be described later, in table 4, and are used by reading out correction coefficients in accordance with width of the imaging light flux in the pupil-division direction, or F value. In a case where a neutral width of the imaging light flux in the pupil-division direction, or F value, is not in a table, a corresponding correction coefficient may be calculated by correcting using width of the imaging light flux in the pupil-division direction, or an F value, positioned in each table on both sides of that neutral value.

Next, the structure of this embodiment will be described using FIG. 12. A camera of this embodiment comprises a body section 20 where main circuitry is arranged, and a lens section 10 capable of being mounted to a chassis of the body section 20. It should be noted that the lens section 10 may also be an interchangeable lens that can be attached to and detached from the body section 20.

An optical system 11, lens information acquisition section 12, memory 13 and control section 14 are provided in the lens section 10. The optical system 11 guides an optical image of a subject to an imaging surface of the image sensor 21 of the body section 20. The optical system 11 has an optical lens, and provides a focus drive function for focusing by performing drive control using the control section 14. The optical system 11 may also have a zoom function, and may also have a single focus photographing lens.

The optical system 11 also has an aperture, and amount of subject light flux that passes within the photographing lens is controlled by controlling opening diameter of the aperture. If the opening diameter of the aperture is changed, incident angle of the subject light flux is also changed.

The lens information acquisition section 12 within the lens section 10 detects lens state information within the lens section 10, for example, zoom position (Zmenc) of the optical system, focus position (subject distance, IO) of the optical system, aperture value (FNo), and outputs this detected lens information to the body section 20.

The memory 13 within the lens section 10 is an electrically rewritable non-volatile memory such as flash memory, and stores various information relating to the lens section 10 such as, for example, information relating to aperture position, aperture diameter, exit pupil position, exit pupil diameter, focus lens position, and vignetting according to image height and direction. The memory 13 also stores information on corrected F value (CF value) and corrected exit pupil position (CEXPI) according to lens state as AF operation parameters. It is possible to calculate information on AF sensitivity in the body section 20 by transmitting the AF operation parameters in the memory 13 to be body section 20. The memory 13 functions as an optical information memory that stores optical information about the photographing optical system.

The body section 20 has an image sensor 21, signal extraction section 22, image processing section 23, display section 24, recording section 25, vibration section 26 and control section 40.

The image sensor 21 is an image sensor such as a CMOS image sensor or CCD image sensor, and is arranged in the vicinity of an imaging position for a subject image formed by the optical system 11. The image sensor 21, as described above, has L pixels and R pixels that are imaging pixels and focus detection pixels. The image sensor 21 subjects a subject image to photoelectric conversion, and outputs a photoelectric conversion signal to the signal extraction section 22. Focus detection pixels within the image sensor 21 function as focus detection pixels that receive a pair of light fluxes resulting from pupil division of light flux that has passed through a photographing optical system.

The signal extraction section 22 has a signal extraction circuit, and extracts and outputs an image signal from output of the image sensor 21. This image signal contains not only an image signal based on output of imaging pixels N, but also an L image signal based on output of the L pixels and an R image signal based on output of the R pixels. The signal extraction section 22 outputs the captured image signal to the image processing section 23, as well has outputting the L image signal and the R image signal that are based on outputs of the focus detection pixels (L pixels and R pixels) to the luminance correction section 29.

The image processing section 23 has an image processing circuit, and carries out specific signal processing, for example, color signal generation processing and matrix conversion processing, and various other signal processing, on the image signal from the signal extraction section 22. The image processing section 23 outputs an image signal after processing to the display section 24, and a taken image is displayed. The image processing section 23 also applies encoding processing to the image signal after processing and outputs compressed image information to the recording section 25, and this image information is recorded.

A card interface, for example, may be adopted as the recording section 25, and the recording section 25 is capable of recording image information and voice information etc. to a memory card or the like. The recording section 25 can also read out image information and audio information that has been recorded on a recording medium, and supply the read out information to the image processing section 23. The image processing section 23 can acquire an image signal and an audio signal by decoding image information and audio information from the recording section 25.

The vibration section 26 contains a vibration mechanism and a vibration circuit, and detects movement such as handshake that has been applied to the camera body 20, using a sensor such as a gyro, and drives the image sensor 21 within a plane that is perpendicular to the optical axis of the optical system 11 so as to counteract this movement (vibration operation). Also, at the time of carrying out a vibration operation, information relating to movement amount of the image sensor 21 is output to the AF sensitivity computation section 27. This is because by carrying out a vibration operation the image sensor 21 moves and affects AF sensitivity.

The body memory 28 has an electrically rewritable non-volatile memory (for example, flash ROM), and as well as the previously described correction coefficients (refer to FIG. 11A and FIG. 11B), stores threshold values such as was shown in FIG. 8B (refer to S31 in FIG. 14), angular displacement information of an oblique-incidence characteristic at the time of manufacture of the image sensor 21, etc. The body memory 28 also stores various adjustment values inside the camera body 20 programs for control of the control section 40 etc.

Each item of information output from the lens section 10 to the AF sensitivity computation section 27 is temporarily stored in the body memory 28 and may be output to the AF sensitivity computation section 27 as required. The body memory 28 functions as a memory that stores correction values in accordance with width of the imaging light flux in the pupil-division direction relating to a two-image interval value.

The control section 40 has a CPU (Central Processing Unit) and peripheral circuits for the CPU. The CPU implements overall control of the camera by controlling each of the sections within the body section 20 in accordance with programs stored in the body memory 28. For example, the control section 40 detects user operation of various switches provided in the chassis of the body section 20, such as, for example a shooting mode setting switch, and a release button for carrying out shooting, and controls each section based on user operation.

Also, the control section 40 has an AF sensitivity computation section 27, luminance correction section 29, two-image interval computation section 30, lens control amount calculation section 31, and correction coefficient reference section 32. Each of these sections is mainly realized by the CPU executing programs. The control section 40 functions as a controller having a focus detection section, a light flux width calculation section, and a defocus amount calculation section.

As has been described above, the AF sensitivity computation section 27 is used when obtaining AF sensitivity in order to calculate defocus amount. Specifically, if AF sensitivity is made α and two-image interval is made A, then defocus amount Def can be represented by Def=α×A. The AF sensitivity computation section 27 is input with movement amount of the image sensor 21 ΔIS from the vibration section 26, lens information from the lens information acquisition section 12 within the lens section 10, and lens information (corrected F value (CF value) and corrected exit pupil position (CEXPI)) from the memory 13. The AF sensitivity computation section 27 functions as a light flux width calculation section that calculates width of the imaging light flux in the pupil-division direction, based on optical information about the photographing optical system. The AF sensitivity computation section 27 also functions as a light flux width calculation section for acquiring optical information from the optical information memory.

The AF sensitivity computation section 27 calculates width of the imaging light flux in the pupil-division direction based on these items of information, and outputs to the correction coefficient reference section 32. It should be noted that calculation of width of the imaging light flux in the pupil-division direction is described in Japanese patent application No. 2014-258922, and so detailed description has been omitted. Also, the AF sensitivity computation section 27 calculates AF sensitivity, and AF operation parameters for luminance correction of L and R image signals, and outputs to the luminance correction section 29 and the lens control amount calculation section 31.

The correction coefficient reference section 32 is input with width of the imaging light flux in the pupil-division direction from the AF sensitivity computation section 27, and reads out correction coefficients in accordance with width of the imaging light flux in the pupil-division direction by referencing a correction coefficient table stored in the body memory 28 (FIG. 11A or FIG. 11B). This read-out correction is output to the two-image interval computation section 30 and used as a correction coefficient when calculating two-image interval.

The luminance correction section 29 is input with an L image signal and R image signal from the signal extraction section 22, and AF operation parameter (luminance correction coefficient) that have been calculated by the AF sensitivity computation section 27, and carries out luminance correction on the L image signal and R image signal. Imbalance between received light amounts of the L image signal and the R image signal, such as is shown in FIG. 4 and FIG. 5, caused by positional offset between micro-lenses of the image sensor 21 and the focus detection pixels, is corrected by this luminance correction.

Using a known calculation method, the two-image interval computation section 30 calculates a two-image interval from the L image signal and the R image signal that have been subjected to luminance correction. Correction of the calculated two-image interval is also carried out using a correction coefficient that has been output from the correction coefficient reference section 32, and the two-image interval after correction is output to the lens control amount calculation section 31.

The two-image interval computation section 30 functions as a focus detection section that detects two-image interval value for the pupil-division direction based on output of the focus detection pixels. This focus detection section detects a first two-image interval value (refer to S15 in FIG. 13), and obtains a second two-image interval value by correcting the first two-image interval value based on a correction value stored in memory and light flux width calculated by a width of the imaging light flux in the pupil-division direction calculation section (refer to S17 in FIG. 13). A defocus amount calculation section, which will be described later, calculates defocus amount based on the second two-image interval value (refer to S19 in FIG. 13). Also, the focus detection section has threshold values relating to the first two-image interval value, and if the first two-image interval value exceeds the threshold value (refer to S31, S33 and S35 in FIG. 14) the focus detection section corrects the first two-image interval value based on the calculated width of the imaging light flux in the pupil-division direction. The focus detection section carries out correction on a difference between the first two-image interval value and the threshold value (refer to S35 in FIG. 14, and equation (11)).

The lens control amount calculation section 31 calculates a defocus amount using the two-image interval from the two-image interval computation circuit 20 and information on the AF sensitivity from the AF sensitivity computation section 27. Even in a case where the left and right pupils have an asymmetrical shape, since the two-image interval is corrected in accordance with size of the width of the imaging light flux in the pupil-division direction, it is possible to calculate the defocus amount with high precision. This calculated defocus amount is output to the control section 14 within the lens section 10, and the control section 14 carries out automatic focus adjustment control by controlling the optical system 11 based on this defocus amount. The lens control amount calculation section 31 functions as a defocus amount calculation section that calculates defocus amount of the photographing optical system based on the two-image interval value.

Next, overall control of the camera of this embodiment will be described using the flowchart shown in FIG. 13. This flowchart (also including the flowchart shown in FIG. 14) is executed by the control section 40 controlling the control section 14 within the lens section 10 and each section within the body section 20, in accordance with programs stored in the body memory 28.

If power supply to the camera is turned on, the control section 40 carries out lens communication (S1). Here, lens information is acquired from the lens information acquisition section 12, and lens information (corrected F value (CF value) and corrected exit pupil position (CEXPI)) is acquired from the memory 13. It should be noted that lens communication is carried out periodically as well as in this step, or undertaken between the control section 40 and the control section 14 as required.

If lens communication has been carried out, next through image display is carried out (S3). A taken image (through image) is subjected to live view display on the display section 24 based on an image signal from the image sensor 21.

Once through image display has been carried out, it is next determined whether or not there is a first release (S5). Here, the control section 40 performs determination based on the state of a first release switch that is linked to a release button being pressed down half way. If the result of this determination is that a first release has not been performed, processing returns to step S1.

If the result of determination in step S5 is that a first release has been performed, angle of emergence of an upper ray and lower ray of light flux at a ranging position is calculated (S7). Here, the AF sensitivity computation section 27 obtains CF value and CEXPI using data such as zoom position, subject distance, aperture, IS portion image height correction that has been stored in the memory 13, and calculates upper ray angle of emergence $\theta_U + \Delta\theta$ and lower ray angle of emergence $\theta_L + \Delta\theta$ of light flux to the ranging position from these values.

If angle of emergence has been calculated, next AF sensitivity is calculated (S9). Here, the AF sensitivity computation section 27 obtains AF sensitivity by referencing a table stored in the body memory 28 using the upper ray angle of emergence $\theta_U + \Delta\theta$ and the lower ray angle of emergence $\theta_L + \Delta\theta$ of the light flux to the ranging position that was obtained and corrected in step S7. Also, at the time of AF sensitivity calculation, the width of the imaging light flux in the pupil-division direction is calculated.

Once AF sensitivity has been calculated, next an AF image is read out (S11). Here, the signal extraction section 22 reads pixel values of focus detection pixels (R pixels and L pixels) from within pixel values that have been read out from the image sensor 21.

Once the AF image has been read, next luminance correction is carried out (S13). Here, luminance correction is carried out on the focus detection pixel values that were read out in step S11, using the AF operation parameter (luminance correction coefficient) that has been output from the AF sensitivity computation section 27.

Once luminance correction has been carried out, next correlation calculation is carried out (S15). Here, the two-image interval computation section 30 carries out correlation calculation using the focus detection pixels that have been subjected to luminance correction, and calculates two-image interval value. The correlation calculation obtains integration of difference for each pixel while shifting L pixels and R pixels by a given shift amount. A shift amount when this estimate value is minimum corresponds to the two-image interval value.

Once correlation calculation has been carried out, next correction processing of the two-image interval value is carried out (S17). Here, the two-image interval computation section 30 carries out correction processing, on the two-image interval value that was calculated in step S15, using a correction coefficient that was output from the correction coefficient reference section 32. By carrying out this correction processing, it is possible to obtain a real defocus amount, as was described using FIG. 8A and FIG. 8B. Detailed operation of step S17 will be described later using FIG. 14.

If correction processing of the two-image interval value has been carried out, next defocus amount calculation is carried out (S19). Here, the lens control amount calculation section 31 calculates defocus amount using two-image interval value that was calculated by the two-image interval computation section 30, and AF sensitivity that was calculated in the AF sensitivity computation section 27.

Once defocus amount has been calculated, next focusing is carried out (S21). Here, the defocus amount that was calculated in step S19 is transmitted to the control section 14 within the lens section 10, and the control section 14 performs drive control based on the defocus amount so that a focus lens reaches an in-focus position.

Once focusing has been carried out, it is next determined whether or not there is a second release (S21). Here, the control section 40 performs determination based on the state of a second release switch that is linked to the release button being pressed down fully.

If the result of determination step S23 is that there is not a second release, then, similarly to step S5, it is determined whether or not there is a first release (S25). If there was a first release, the determinations of steps S23 and S25 are repeated. On the other hand, in the event that first release has not been performed, it is a state where a finger has been removed from the release button and the half pressing of the release button has been released, and processing returns to step S1.

If the result of determination in step S23 is second release, shooting is carried out (S27). At the point in time where shootings carried out, a focus adjustment operation is completed using the defocus amount having had the two-image interval value corrected, and the subject is in focus. Once shooting has commenced, the image sensor 21 is exposed for a shutter time, and once the shifted time has elapsed pixel values are readout from the image sensor 21 and pixel values of imaging pixels are extracted by the signal extraction section 22. The extracted pixel values are stored in the recording section 25 after having been subjected to image processing by the image processing section 23. Once shooting is completed, processing returns to step S1.

Next, detailed operation of the two-image interval value correction processing in step S17 will be described using the flowchart shown in FIG. 14.

Figure 14:
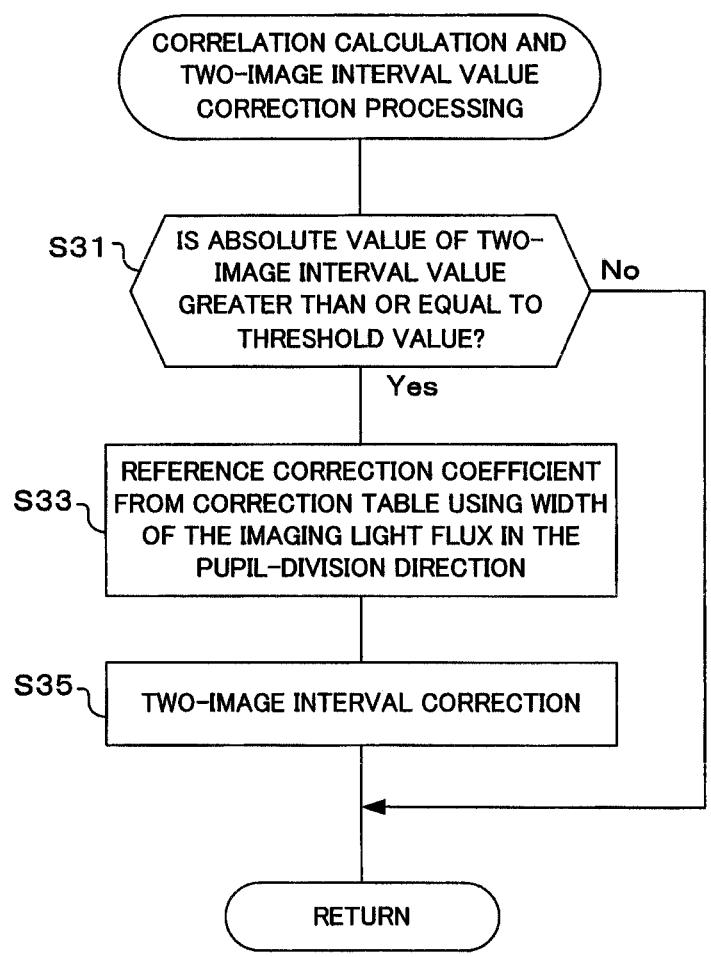
FIG. 14 is a flowchart showing operation of correlation calculation and two-image interval value correction processing of the camera of one embodiment of the present invention.

If the flow of FIG. 14 presented, it is first determined whether or not an absolute value of the two-image interval value exceeds a threshold value (S31). Here, determination is performed by comparing absolute value of the two-image interval value that was calculated in step S15 and the threshold value. As the threshold value, two-image interval value such that an error amount of defocus amount that was calculated using AF sensitivity, and two-image interval value obtained by correlation calculation, becomes a range that falls within a permissible depth, is set in advance as a threshold value.

Next, a correction coefficient is referenced from the correction table using width of the imaging light flux in the pupil-division direction (S33). Here, a correction coefficient is referenced or calculated from a correction table (refer to FIG. 11A or FIG. 11B) that has been stored in the body memory 28 using width of the imaging light flux in the pupil-division direction that was calculated by the AF sensitivity computation section 27, or F value of the photographing lens that was transmitted from the lens 10.

If the correction coefficient has been referenced or calculated, next a corrected two-image interval value is calculated (S35). Here, corrected two-image interval value is calculated based on equation (11) below in association with FIG. 11A by using correction coefficients C (C3, C2, C1, C0) that were read-out or calculated in step S33 for two-image interval values D that were calculated in step S15.

$$CD=D-(C3*(D-D/|D|*Th)^3+C2*(D-D/|D|*Th)^2+C1*(D-D|D|*Th)+C0) \quad (11)$$

Here,
CD: corrected two-image interval value
D: two-image interval value
C3: third order correction coefficient
C2: second order correction coefficient C1: first order correction coefficient
C0: zero order correction coefficient
Th: threshold value It should be noted that "*" means multiply, "/" means divide, and "|D|" means acquiring an absolute value for two-image interval value.

Once a corrected two-image interval value CD has been corrected, the originating flow is returned to.

Corrected two-image interval value may also be calculated based on equation (12) below in association with FIG. 11B.

$$CD=D-C1*(D-D/|D|*Th) \qquad (12)$$

Here,
CD: corrected two-image interval value
D two-image interval value
C1: first order correction coefficient
Th: threshold value It should be noted that "*" means multiply, "/" means divide, and "|D|" means acquiring an absolute value for two-image interval value.

Figure 12:
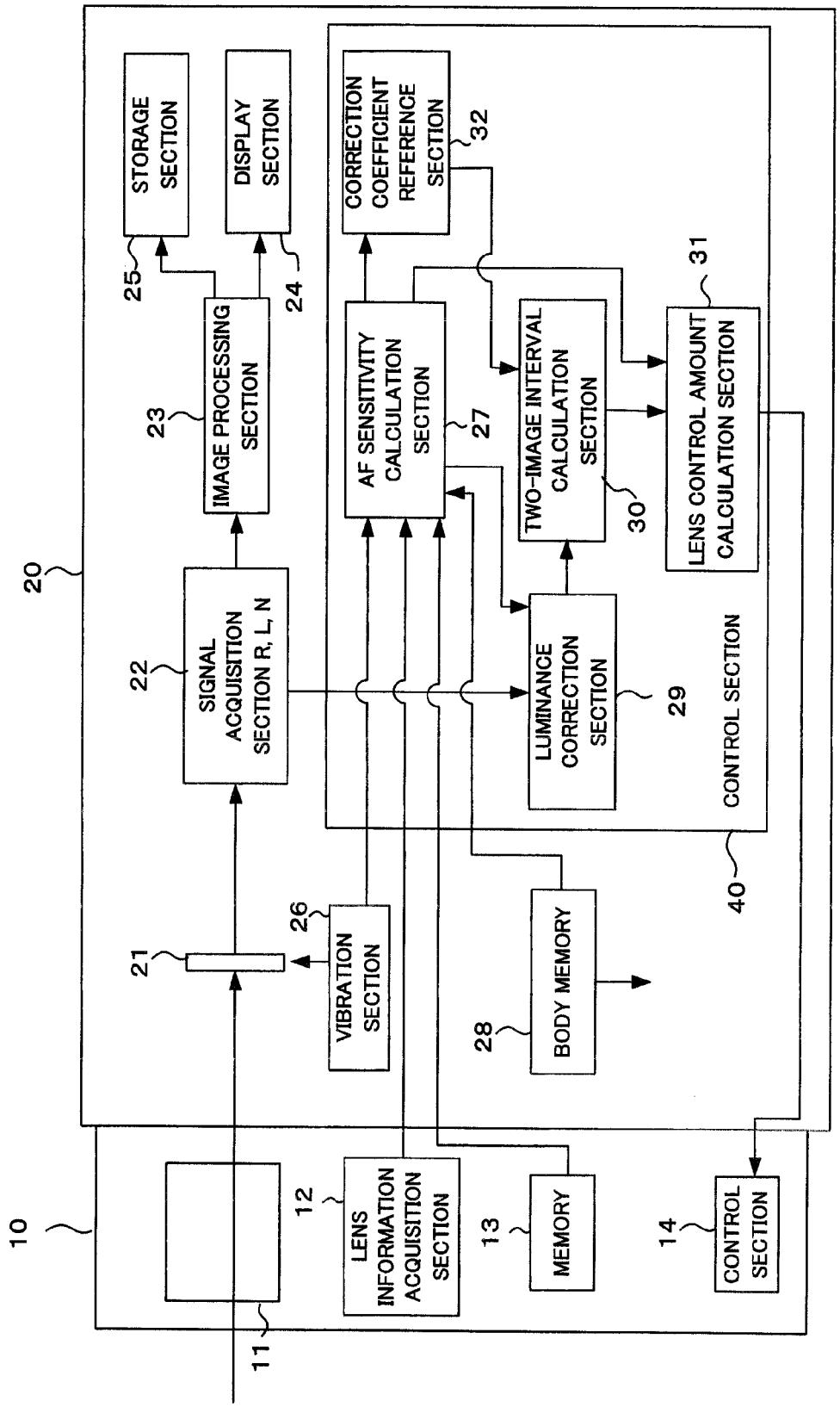
FIG. 12 is a block diagram mainly showing the electrical structure of a camera of one embodiment of the present invention.

As has been described above, with the one embodiment of the present invention, there are provided focus detection pixels that receive a pair of light fluxes resulting from pupil-division of light flux having passed through a photographing optical system (refer, for example, to FIG. 1 and the image sensor 21 in FIG. 12), and a storage section that stores correction value in accordance with width of the imaging light flux in the pupil-division direction (refer, for example, to the body memory 28 in FIG. 12). Width of the imaging light flux in the pupil-division direction is calculated based on optical information of the photographing optical system (for example, S9 in FIG. 13), two-image interval value for the pupil-division direction is detected as a first two-image interval value based on output of the focus detection pixels (for example, S15 in FIG. 13), the first two-image interval value is corrected based on a correction value stored in the storage section and light flux width to obtain a second two-image interval value (for example, S17 in FIG. 13), and defocus amount of the photographing optical system is calculated based on the second two-image interval value (for example, S19 in FIG. 13). Specifically, in this embodiment, a first two-image interval value is obtained, and correction calculation is carried out for this two-image interval value to obtain a second two-image interval value. This means that when calculating defocus amount, it is possible to reduce calculation error with a smaller data amount and simple processing.

Figure 13:
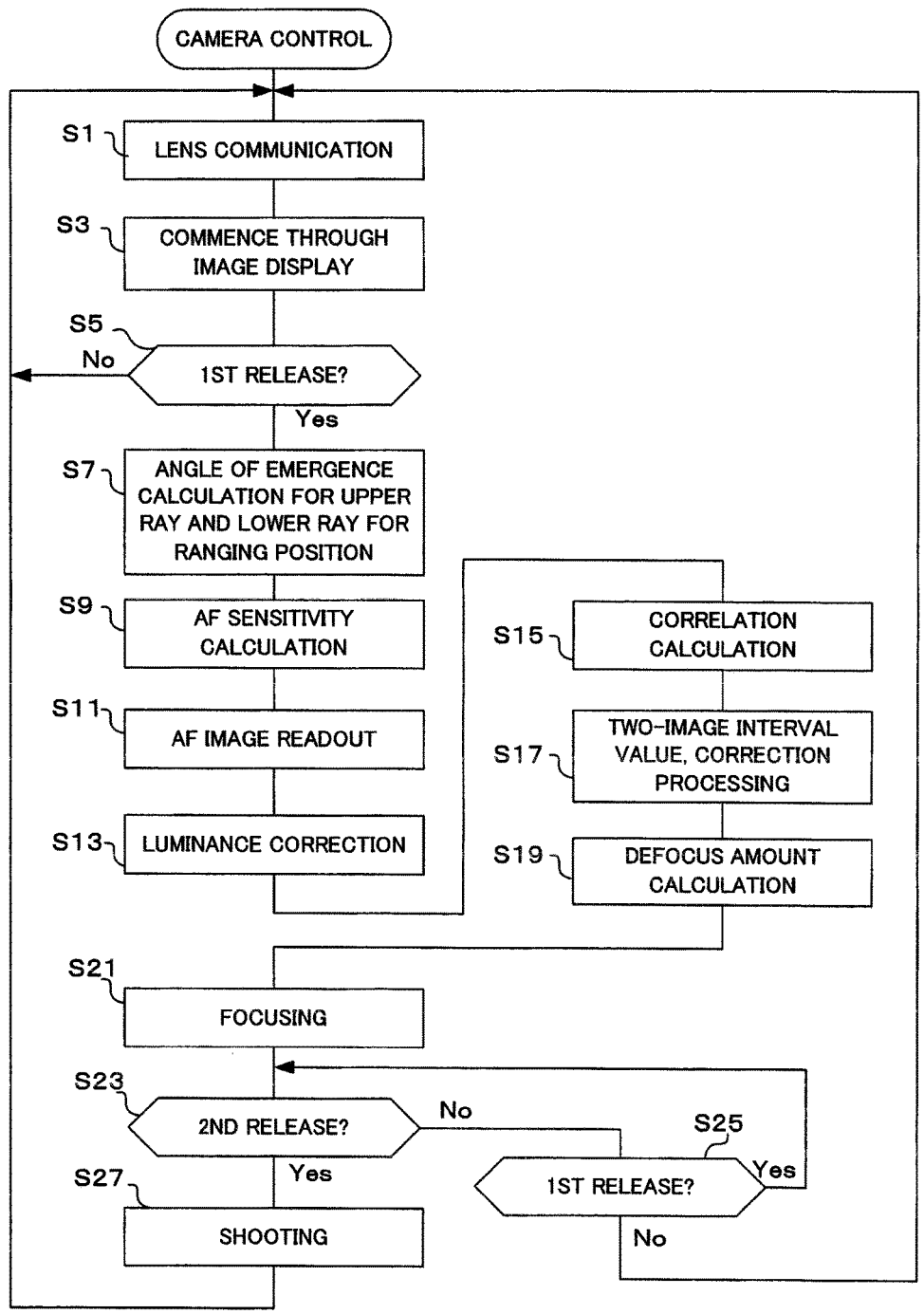
FIG. 13 is a flowchart showing main operation of the camera of one embodiment of the present invention.

Also, with the one embodiment of the present invention, correction is carried out on a two-image interval value (refer, for example, to S17 and FIG. 14 in FIG. 13). With the focus detection apparatus disclosed in previously described patent publication 1, since AF sensitivity was corrected in the event that defocus amount is larger than a threshold value it was necessary to carry out correction calculation once after calculation of defocus amount. Conversely, according to this embodiment, since is it possible to carry out correction at a point in time where a two-image interval value has been calculated, before calculating defocus amount, it is possible to simplify processing.

Also, with the one embodiment of the present invention, a correction coefficient is set in accordance with width of the imaging light flux in the pupil-division direction (substantially F value) (refer, for example, to FIG. 11A and FIG. 11B). Specifically, the AF sensitivity computation section 27 (functioning as a light flux width calculating section) calculates F value as width of the imaging light flux in the pupil-division direction, and the body memory 28 stores correction value in accordance with F value (for example, FIG. 11A, FIG. 11B, and S33 in FIG. 13). This means that it becomes possible to reduce error in defocus amount based on asymmetry of pupil shape.

Also, with two-image interval value within a threshold value, defocus amount is obtained with a factor of proportionality using AF sensitivity (No in S31 of FIG. 14, S19 of FIG. 13), while with the two-image interval value outside a threshold value correction is carried out for increase in two-image interval from the threshold value (Yes in S31 and S35 of FIG. 14, S19 in FIG. 13). As a result, defocus amount before and after the threshold value does not become unnatural, and it is possible to ensure continuity. Accordingly it is possible to prevent defocus amount calculated before and after threshold value defocus becoming discontinuous, and to prevent error not being reduced in the vicinity of this defocus amount.

It should be noted that with the one embodiment of the present invention, width of the imaging light flux in the pupil-division direction is calculated, and based on this width in the pupil-division direction correction coefficient is acquired using table reference (refer to S35 in FIG. 14). However when acquiring correction coefficient a value corresponding to pupil size may be enough instead of using the width itself. Further, correction coefficients for a case where approximation is performed with a first order function or third order the function is shown in FIG. 11A and FIG. 11B, but this is not limiting, and approximation may also be performed with other functions. Also two-image interval value has been corrected using equation (11), but this equation is not limiting, and a computational expression that can approximate to the real defocus amount shown in FIG. 8A is also possible.

Also, in the one embodiment of the present invention, the signal extraction section 22, image processing section 23, vibration section 26 etc. are constructed separately from the control section 40, but some or all of these sections may be constituted by software, and executed by a CPU within the control section 40. Also, the AF sensitivity computation section 27, luminance correction section 29, two-image interval computation section 30, lens control amount calculation section 31 and correction coefficient reference section 32 within the control section 40, besides all being implemented using software, may have some or all of the sections configured as hardware circuits, and may have a hardware structure such as gate circuits that are generated based on a programming language described using Verilog, and may be use a hardware structure that uses software, such as a DSP (Digital Signal Processor). These approaches may be appropriately combined.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc., or a camera for a scientific instrument such as a microscope, a camera for mounting on a vehicle, a surveillance camera etc. In any event, it is possible to adopt the present invention as long as a device carries out focus adjustment using a pupil-division image plane phase difference method.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they may be downloaded via the Internet.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they may be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus detection apparatus, comprising
   focus detection pixels that receive a pair of light fluxes resulting from pupil division of light flux that has passed through a photographing optical system,
   a memory that stores correction values in accordance with width of the imaging light flux in the pupil-division direction relating to a two-image interval value, and
   a controller having a focus detection section, a light flux width calculation section, and a defocus amount calculation section, wherein
   the focus detection section detects a two-image interval value in the pupil-division direction, based on output of the focus detection pixels,
   the light flux width calculation section calculates width of the imaging light flux in the pupil-division direction based on optical information of the photographing optical system, and
   the defocus amount calculation section calculates defocus amount of the photographing optical system based on the two-image interval value,
   wherein the focus detection section detects a first two-image interval value, and obtains a second two-image interval value by correcting the first two-image interval value based a correction value stored in the memory and width of the imaging light flux in the pupil-division direction calculated by the light flux width calculation section, and the defocus amount calculation section calculates defocus amount based on the second two-image interval value, and
   wherein the focus detection section has a threshold value relating to the first two-image interval value, and, in the event that the first two-image interval value exceeds the threshold value, corrects the first two-image interval value based on the calculated width of the imaging light flux in the pupil-division direction.

2. The focus detection apparatus of claim 1, wherein
   the focus detection section carries out correction for a difference between the first two-image interval value and the threshold value.

3. The focus detection apparatus of claim 1, wherein
   the light flux width calculation section calculates F value as the width of the imaging light flux in the pupil-division direction, and
   the memory stores correction values in accordance with the F value.

4. The focus detection apparatus of claim 1, further comprising:
   an interchangeable lens that includes the photographing optical system, wherein
   the interchangeable lens has an optical information memory that stores optical information of the photographing optical system, and
   the light flux width calculation section acquires the optical information from the optical information memory.

5. A focus detection method for a focus detection apparatus for a photographing optical system that is provided with focus detection pixels that receive a pair of light fluxes resulting from pupil-division of light flux that passes through a photographing optical system, and a memory that stores correction values in accordance with width of the imaging light flux in the pupil-division direction of the photographing optical system, the method comprising:
   calculating width in the pupil-division direction of the imaging light flux based on optical information of the photographing optical system;
   calculating a two-image interval value pupil-division for the based on output of the focus detection pixels as a first two-image interval value;
   calculating a second two-image interval value by correcting the first two-image interval value based on a correction value stored in the memory and a light flux width that has been calculated; and
   calculating defocus amount of the photographing optical system based on the second two-image interval value,
   wherein the memory stores a threshold value relating to the first two-image interval value, and in the event that the first two-image interval value exceeds the threshold value, the first two-image interval value is corrected based on the calculated width of the imaging light flux in the pupil-division direction, and the second two-image interval value.

6. The focus detection method of claim 5, wherein
   correction is carried out on a difference between the first two-image interval value and the threshold value, and the second two-image interval value is corrected.

7. The focus detection method of claim 5, further comprising:
   calculating an F value as the width of the imaging light flux in the pupil-division direction, and
   retrieving correction values in accordance with the F value in the memory.

8. The focus detection method of claim 5, wherein the focus detection apparatus further comprises an interchangeable lens that includes the photographing optical system, the interchangeable lens having an optical information memory that stores optical information of the photographing optical system, and wherein the optical information is acquired from the optical information memory.

9. A non-transitory computer-readable medium storing a processor executable code, which when executed by at least one processor included in a focus detection apparatus, performs an focus detection method, the focus detection apparatus comprising focus detection pixels that receive a pair of light fluxes resulting from pupil-division of light flux that passes through a photographing optical system, and a memory that stores correction value in accordance with width of the imaging light flux in the pupil-division direction of the photographing optical system, the focus detection method comprising:

calculating width in the pupil-division direction of the imaging light flux based on optical information of the photographing optical system;

calculating a two-image interval value pupil-division for the based on output of the focus detection pixels as a first two-image interval value;

calculating a second two-image interval value by correcting the first two-image interval value based on a correction value stored in the memory and a light flux width that has been calculated; and calculating defocus amount of the photographing optical system based on the second two-image interval value, wherein the memory stores a threshold value relating to the first two-image interval value, and in the event that the first two-image interval value exceeds the threshold value, the first two-image interval value is corrected based on the calculated width of the imaging light flux in the pupil-division direction, and the second two-image interval value.

* * * * *